(12) United States Patent
Aihara

(10) Patent No.: US 6,505,043 B1
(45) Date of Patent: Jan. 7, 2003

(54) MOBILE COMMUNICATION SYSTEM CAPABLE OF SELECTING RELEVANT BASE STATION TO BE CONNECTED TO MOBILE STATION FROM BASE-STATION-DESCRIBED NEIGHBOR LIST PRODUCED BASED ON THE NUMBER OF TIMES OF HAND-OVER OPERATIONS

(75) Inventor: Makoto Aihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/566,977

(22) Filed: May 9, 2000

(30) Foreign Application Priority Data

May 20, 1999 (JP) ............................................ 11-139564

(51) Int. Cl.[7] .................................................. H04J 4/00
(52) U.S. Cl. ........................ 455/436; 455/441; 455/444; 455/439
(58) Field of Search ................................ 455/512, 517, 455/525, 436, 439, 437, 422, 438, 67.1, 442, 441, 444

(56) References Cited

U.S. PATENT DOCUMENTS

| 5,117,502 A | * | 5/1992 | Onoda et al. ............... 455/434 |
| 5,507,008 A | | 4/1996 | Kanai et al. ................ 455/512 |
| 5,535,425 A | * | 7/1996 | Watanabe .................... 455/436 |
| 5,722,073 A | * | 2/1998 | Wallstedt et al. ........... 455/436 |
| 5,907,807 A | * | 5/1999 | Chavez et al. .............. 455/435 |
| 5,924,042 A | * | 7/1999 | Sakamoto et al. .......... 340/7.27 |
| 6,157,837 A | * | 12/2000 | Kato et al. .................. 455/436 |
| 6,256,500 B1 | * | 7/2001 | Yamashita ................... 455/437 |
| 6,285,874 B1 | * | 9/2001 | Magnusson et al. ......... 455/422 |
| 6,311,065 B1 | * | 10/2001 | Ushiki et al. ............... 342/457 |
| 6,400,943 B1 | * | 6/2002 | Montoya ................ 342/357.01 |
| 6,414,947 B1 | * | 7/2002 | Legg et al. .................. 370/331 |

FOREIGN PATENT DOCUMENTS

| JP | 5-316023 | 11/1993 |
| JP | 7-307972 | 11/1995 |
| JP | 2710180 | 10/1997 |
| JP | 9-284828 | 10/1997 |
| JP | 10-248090 | 9/1998 |

* cited by examiner

Primary Examiner—Thanh Cong Le
Assistant Examiner—Lana Le
(74) Attorney, Agent, or Firm—Foley & Lardner

(57) ABSTRACT

A mobile communication system is composed of a plurality of base stations including a first and second connecting base stations and a mobile terminal connected to the first connecting base station. Relevant base stations are selected from among the plurality of base stations based on hand-over counts, each of which indicates the number of times of hand-over operations of the mobile terminal from the first connecting base station to one of the plurality of base stations. A second connecting base station is selected from among the relevant base stations based on electric field intensities from the relevant base stations, and the mobile terminal establishes a connecting link with the second connecting base station.

19 Claims, 13 Drawing Sheets

Fig. 6

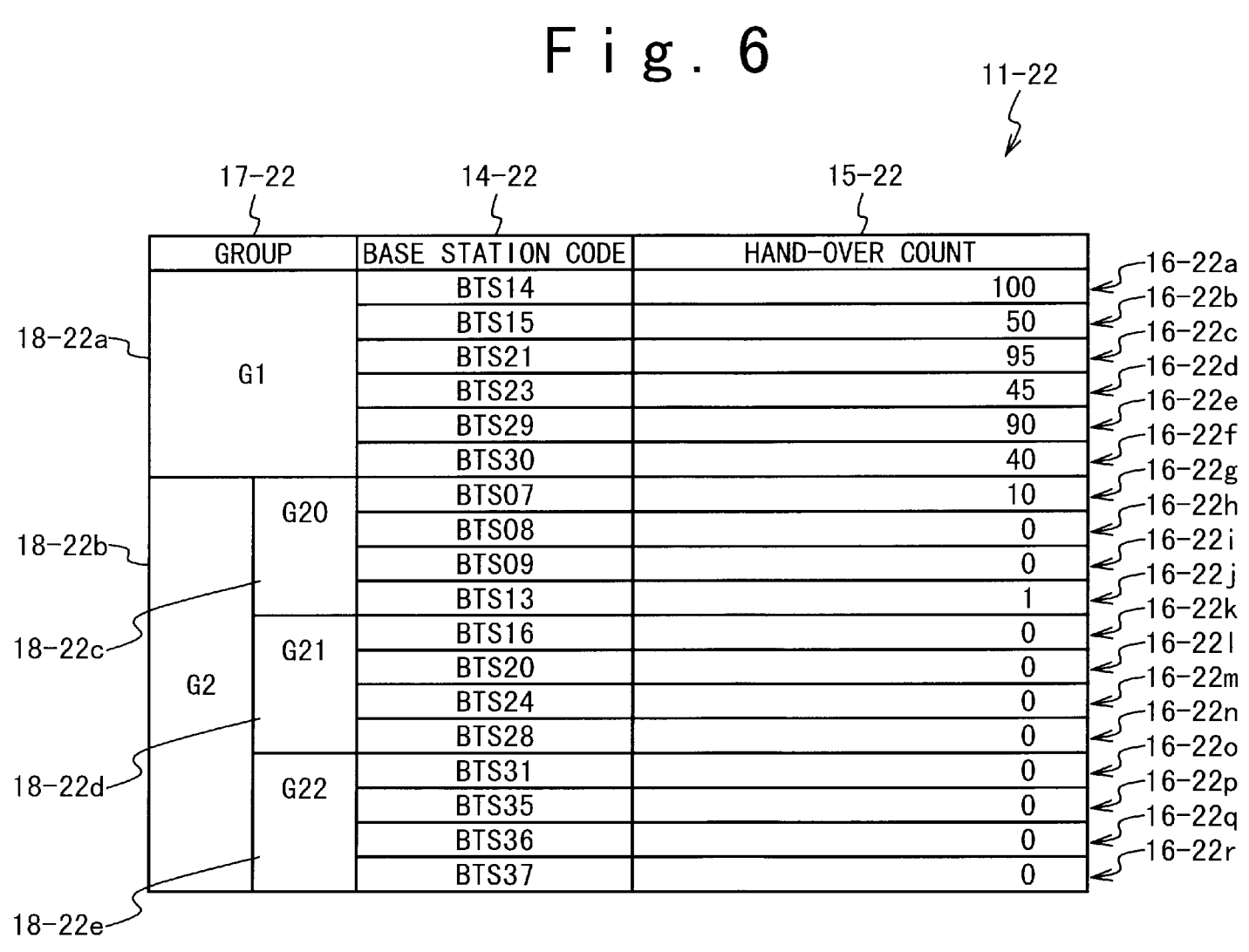

| GROUP 17-22 | | BASE STATION CODE 14-22 | HAND-OVER COUNT 15-22 |
|---|---|---|---|
| G1 | | BTS14 | 100 |
| | | BTS15 | 50 |
| | | BTS21 | 95 |
| | | BTS23 | 45 |
| | | BTS29 | 90 |
| | | BTS30 | 40 |
| | G20 | BTS07 | 10 |
| | | BTS08 | 0 |
| | | BTS09 | 0 |
| | G21 | BTS13 | 1 |
| | | BTS16 | 0 |
| | | BTS20 | 0 |
| | | BTS24 | 0 |
| | | BTS28 | 0 |
| | G22 | BTS31 | 0 |
| | | BTS35 | 0 |
| | | BTS36 | 0 |
| | | BTS37 | 0 |

| | GROUP G1 | GROUP G2 |
|---|---|---|
| LIST 1 | BTS14 BTS15 BTS21 BTS23 BTS29 BTS30 | BTS07 BTS08 BTS09 BTS13 |
| LIST 2 | BTS14 BTS15 BTS21 BTS23 BTS29 BTS30 | BTS16 BTS20 BTS24 BTS28 |
| LIST 3 | BTS14 BTS15 BTS21 BTS23 BTS29 BTS30 | BTS31 BTS35 BTS36 BTS37 |

19-22a
19-22b
19-22c 12-14

| | GROUP 1 | GROUP 2 |
|---|---|---|
| LIST 1 | BTS07 BTS08 BTS13 BTS15 BTS21 BTS22 | BTS02 BTS03 BTS04 BTS06 |
| LIST 2 | BTS07 BTS08 BTS13 BTS15 BTS21 BTS22 | BTS09 BTS12 BTS16 BTS20 |
| LIST 3 | BTS07 BTS08 BTS13 BTS15 BTS21 BTS22 | BTS23 BTS28 BTS29 BTS30 |

Fig. 11

| GROUP | | BASE STATION CODE | HAND-OVER COUNT |
|---|---|---|---|
| G1 | | BTS14 | 101 |
| | | BTS15 | 50 |
| | | BTS21 | 95 |
| | | BTS23 | 45 |
| | | BTS29 | 90 |
| | | BTS30 | 40 |
| | G20 | BTS07 | 10 |
| | | BTS08 | 0 |
| | | BTS09 | 0 |
| G2 | G21 | BTS13 | 1 |
| | | BTS16 | 0 |
| | | BTS20 | 0 |
| | G22 | BTS24 | 0 |
| | | BTS28 | 0 |
| | | BTS31 | 0 |
| | | BTS35 | 0 |
| | | BTS36 | 0 |
| | | BTS37 | 0 |

11-22

| GROUP | | BASE STATION CODE | HAND-OVER COUNT |
|---|---|---|---|
| G1 | | BTS14 | 101 |
| | | BTS21 | 95 |
| | | BTS29 | 90 |
| | | BTS15 | 50 |
| | | BTS23 | 45 |
| | | BTS30 | 40 |
| | | BTS07 | 10 |
| | | BTS13 | 1 |
| G2 | G20 | BTS08 | 0 |
| | | BTS09 | 0 |
| | | BTS16 | 0 |
| | | BTS20 | 0 |
| | G21 | BTS24 | 0 |
| | | BTS28 | 0 |
| | | BTS31 | 0 |
| | | BTS35 | 0 |
| | G22 | BTS36 | 0 |
| | | BTS37 | 0 |

| | GROUP 1 | GROUP 2 |
|---|---|---|
| LIST 1 | BTS14 BTS21 BTS29 BTS15 BTS23 BTS30 BTS07 BTS13 | BTS08 BTS09 BTS16 BTS20 |
| LIST 2 | BTS14 BTS21 BTS29 BTS15 BTS23 BTS30 BTS07 BTS13 | BTS24 BTS28 BTS31 BTS35 |
| LIST 3 | BTS14 BTS21 BTS29 BTS15 BTS23 BTS30 BTS07 BTS13 | BTS36 BTS37 |

MOBILE COMMUNICATION SYSTEM CAPABLE OF SELECTING RELEVANT BASE STATION TO BE CONNECTED TO MOBILE STATION FROM BASE-STATION-DESCRIBED NEIGHBOR LIST PRODUCED BASED ON THE NUMBER OF TIMES OF HAND-OVER OPERATIONS

BACKGROUND OF THE INVENTION

1. Field of the Invention

The present invention generally relates to a mobile communication system and a mobile communication method. More specifically, the present invention is directed to a mobile communication system and a mobile communication method, capable of selecting a wireless base station functioning as a hand-over destination based on a neighbor list when a hand-over operation occurs.

2. Description of the Related Art

Mobile communication systems constructed of a plurality of base stations capable of covering a service area are widely used in the technical field. A mobile station and a base station communicate with each other via a communication link.

While a communication link is established between a certain mobile station and a certain base station, the communication link is required to be interrupted, or cut off, depending upon a condition of the communication link. In the case that a communication link between the mobile station and another base station may be established under better condition, another communication link must be established between the mobile station and the other base station.

The methods for interrupting the communication link between the mobile station and the base station, or for establishing the communication link between another base station and the mobile station are known from, for example, Japanese Laid-open Patent Applications (JP-A Heisei 5-316023, JP-A Heisei 7-307972, JP-A Heisei 9-284828, and JP-A Heisei 10-248090), and Japanese Patent Office Gazette (2710180).

When a communication link between a mobile station and a base station is established, the base station may be determined with reference to a neighbor list. A neighbor list implies such a list indicative of base stations which may constitute base station subjects capable of establishing communication links with a mobile station. Base station codes specific to the respective base stations are given to these base stations. The neighbor list is constituted by base station codes of base stations which constitute base station subjects for establishing communication links.

In general, a neighbor list is notified from a base station to a mobile station. The mobile station receives electromagnetic waves transmitted from base stations having base station codes which are listed in this neighbor list. The mobile station measures electric field intensities of these electromagnetic waves. Based upon measurement results of the electric field intensities, such a base station which will establish a communication link with this mobile station may be determined.

Generally speaking, neighbor lists must be properly produced. In such a case that a neighbor list does not contain such a base station code of an optimum base station when a communication link is established, a mobile station cannot switch a connection to such a base station, while this base station may constitute an optimum base station functioning as a base station when a communication link is established. As a result, this mobile station is forcibly communicated with a not-proper base station. Thus, a communication quality during communication would be lowered. In the worst case, the communication would be interrupted. Also, interference given to other mobile stations may be increased. Therefore, communication qualities of other mobile stations may be lowered.

On the other hand, in such a case that a large number of base station codes of such base stations which are not suitable to establish communication links are contained in a neighbor list, lengthy measuring time of electric field intensities is required. Thus, a time period required to determine a proper base station while a communication link is established would be prolonged. Also, in this case, communication qualities while communications are performed would be lowered. In the worst case, the communication may be cut off.

As a consequence, proper base stations are selected and indicated in such a neighbor list.

SUMMARY OF THE INVENTION

Therefore, the present invention has an object to provide a mobile communication system capable of selecting a base station to be connected to a mobile station based upon a properly formed neighbor list.

In order to achieve an aspect of the present invention, a mobile communication system includes a plurality of base stations includes a first and second connecting base stations and a mobile terminal connected to the first connecting base station. Relevant base stations are selected from among the plurality of base stations based on hand-over counts, each of which indicates the number of times of hand-over operations of the mobile terminal from the first connecting base station to one of the plurality of base stations. A second connecting base station is selected from among the relevant base stations based on electric field intensities from the relevant base stations, and the mobile terminal establishes a connecting link with the second connecting base station.

A mobile communication may further include a controlling station. The controlling station sends a neighbor list indicative of the relevant base stations to the mobile terminal. The mobile terminal measures the electric field intensities in response to the neighbor list and sends a electric-field-indicative signal indicative of the electric field intensities to the controlling station. The controlling station selects the second connecting base station in response to the electric-field-indicative signal.

The controlling station may include a hand-over count indicating table indicative of the hand-over counts and produce the neighbor list referring to the hand-over count indicating table.

The hand-over count indicating table may indicate that each of the plurality of base stations is classified into a plurality of groups based on the hand-over counts, and the plurality of groups consists of a dominant group and remaining ones of the plurality of groups. The number of times of communication of the mobile terminal with base stations classified into the dominant group after communicating with the first connecting base station is larger than that with base stations classified into the remaining ones of the plurality of groups. The neighbor list indicates as the relevant base stations all of base stations classified into the first dominant group and include some but not all base stations classified into the remaining ones.

The controlling station may further include a neighbor list generating table including a plurality of lists. The base stations classified into the dominant group are indicated in each of the plurality of lists, and the base stations classified into the remaining ones of the plurality of groups are indicated in one or more but not all of the plurality of lists, and the neighbor list is produced by being selected from among the plurality of lists.

In order to achieve another aspect of the present invention, a controlling station used in a mobile communication system includes a controlling unit. The controlling unit selects relevant base stations from among a plurality of base stations based on hand-over counts, each of which indicates the number of times of communication of a mobile terminal with one of the plurality of base stations after communicating with another base station as a first connecting base station. The controlling unit sends a neighbor list indicative of the relevant base stations to the mobile terminal. And the controlling unit selects a second connecting base station with which the mobile terminal establishes a connecting link from among the relevant base stations based on electric field intensities from the relevant base stations measured by the mobile terminal.

In order to achieve still another aspect of the present invention, a method of operating a mobile communication system includes selecting relevant base stations from among a plurality of base stations based on hand-over counts, each of which indicates the number of times of hand-over operations of a mobile terminal from a first connecting base station to one of the plurality of base stations, selecting a second connecting base station from among the relevant base stations based on electric field intensities from the relevant base stations and establishing a connecting link between the mobile station and the second connecting base station.

In order to achieve yet still another aspect of the present invention, a computer-readable recording medium stores a program for a method which includes selecting relevant base stations from among a plurality of base stations based on hand-over counts, each of which indicates the number of times of hand-over operations of a mobile terminal from a first connecting base station to one of the plurality of base stations, selecting a second connecting base station from among the relevant base stations based on electric field intensities from the relevant base stations and establishing a connecting link between the mobile station and the second connecting base station.

BRIEF DESCRIPTION OF THE DRAWINGS

The above and further objects, novel features and advantages of the present invention will more fully become obvious upon an understanding of the following detailed description taken in connection with the accompanying drawings, in which:

FIG. 6 represents a table content of a hand-over count table 11-22 employed in the mobile communication system;

FIG. 7 represents a table content of a hand-over count table 12-22 employed in the mobile communication system;

FIG. 11 shows an updated table content of the hand-over count table 11-22;

FIG. 14 shows an updated table content of the neighbor list generating table 12-22.

DESCRIPTION OF THE PREFERRED EMBODIMENTS

Referring now to drawings, a mobile communication system according to a preferred embodiment mode of the present invention will be described in detail.

Overview of Mobile Communication System

Figure 1:
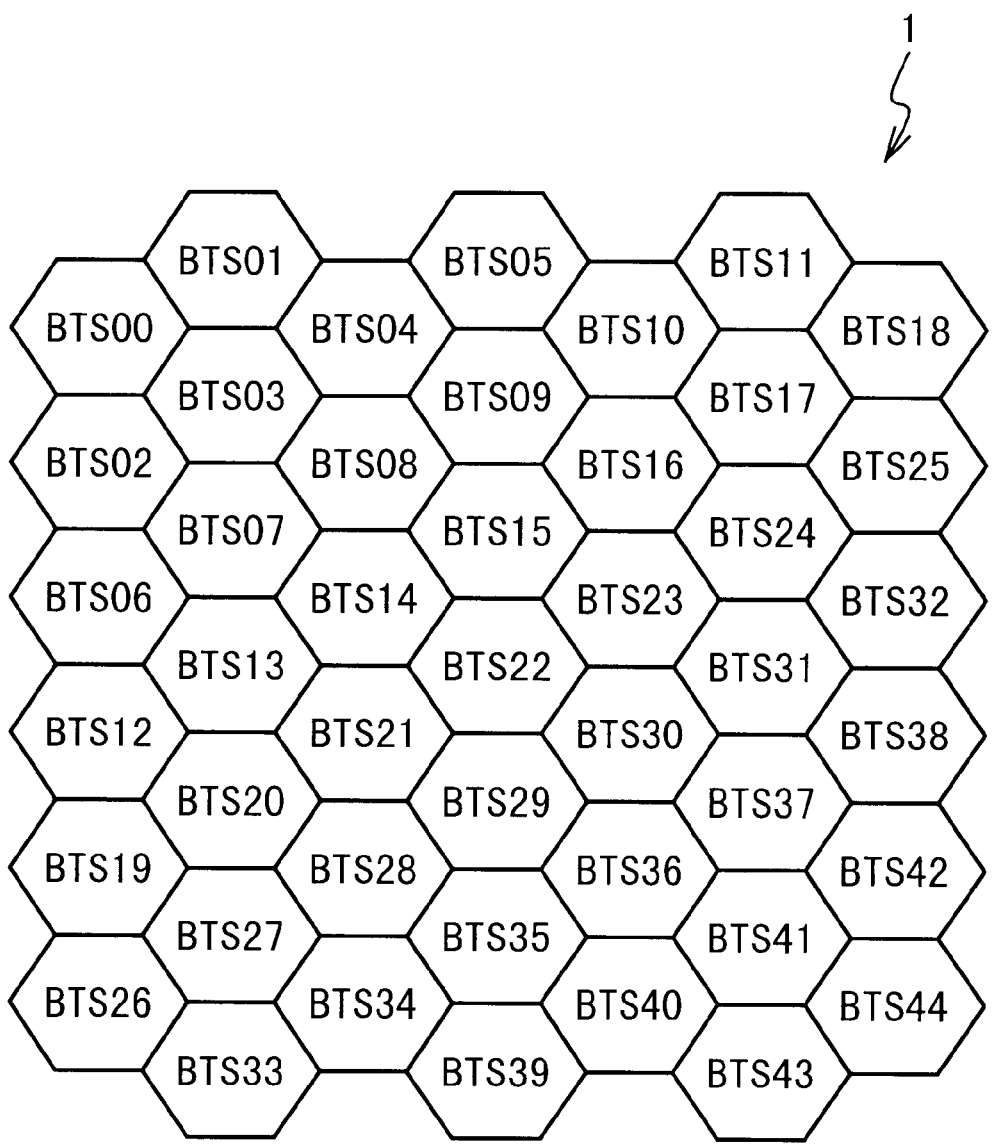
FIG. 1 illustratively represents an arrangement of base stations covered by a mobile communication system according to an embodiment mode of the present invention.

As shown in the drawings, a mobile communication system according to an embodiment mode of the present invention owns a service area. In the service area 1, base stations BTS00 to BTS44 are provided as illustrated in FIG. 1. Base station codes are given to base stations BTS00 to BTS44, respectively. A base station code of the base station BTS00 is a "BTS00". Similarly, a base station code of the base station BTSi is a "BTSi". In this case, symbol "i" shows any integer selected between 00 and 44.

Figure 2:
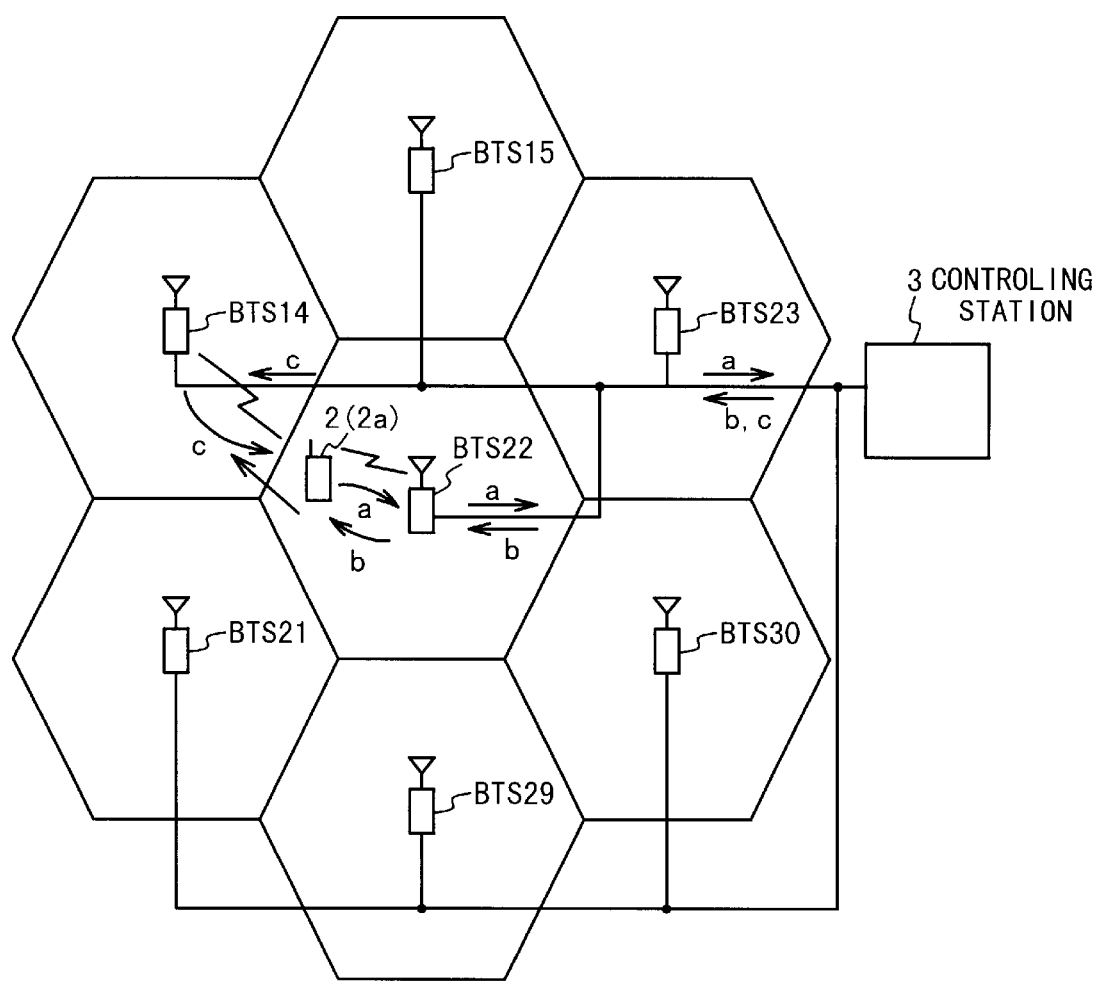
FIG. 2 is a schematic structural diagram of the mobile communication system according to the embodiment mode of the present invention.

FIG. 2 illustratively represents a partial area of this service area 1. As shown in FIG. 2, the mobile communication system according to this embodiment mode further contains a mobile station 2. This mobile station 2 may communicate with one or a plurality of these base stations BTS00 to BTS44. When this mobile communication system employs either the FDMA (Frequency Division Multiple Accesses) communication system or the TDMA (Time Division Multiple Accesses) communication system, the mobile station 2 may communicate with one of these plural base stations BTS00 to BTS44. On the other hand, when this mobile communication system employs the CDMA (Code Division Multiple Access) communication system, the mobile station 2 may communicate with plural base stations among the base stations BTS00 to BTS44.

These base stations BTS00 to BTS44 are connected to a control station 3. That is, as indicated in FIG. 2, the base stations BTS14, BTS15, BTS21, BTS22, BTS23, BTS29, and BTS30 are connected to the control station 3. Other base stations are also connected to the control station 3. The base stations BTS00 to BTS44 transmit a signal received from the mobile station 2 to the control station 3. Moreover, the base stations BTS00 to BTS44 transmit a signal received from the control station 3 to the mobile station 2.

Arrangement of Mobile Communication System

Figure 3:
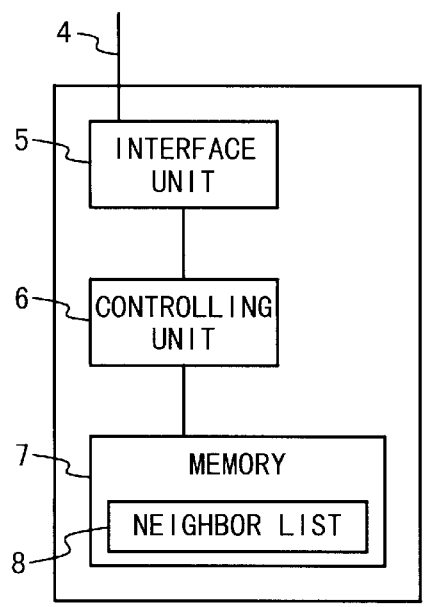
FIG. 3 is a block diagram for showing an arrangement of a mobile station 2.
Figure 4:
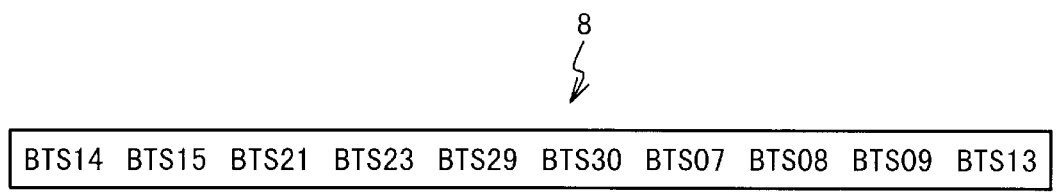
FIG. 4 represents a content of a neighbor list stored in a neighbor list storage unit 8.

FIG. 3 represents an internal arrangement of the above-described mobile station 2. As shown in FIG. 3, the mobile station 2 contains an antenna 4. The antenna 4 is connected to an interface unit 5. The interface unit 5 demodulates electromagnetic waves received via the antenna 4 from such a base station that a link can be established among the base stations BRS00 to BTS44 with respect to this mobile station 2. Further, the interface unit 5 modulates electromagnetic waves which are transmitted via the antenna 4 to the relevant linked-base station. The interface unit 5 is connected to a control unit 6. The control unit 6 processes such signals received via the antenna 4 and the interface unit 5 from the control station 3. In addition, the control unit 6 produces a signal which will be transmitted to the control station 3, and then transmits the produced signal to the interface unit 5. The control unit 6 is connected to a memory 7. The memory 7 contains a neighbor list storage unit 8. This neighbor list storage unit 8 stores thereinto a neighbor list. FIG. 4 represents a content of this neighbor list stored in the neighbor list storage unit 8. In this neighbor list storage unit 8, base station codes of the following base stations are stored. That is, in such a case that the mobile station 2 tries to establish links with respect to base stations other than such a base station where the link has been presently established.

Figure 5:
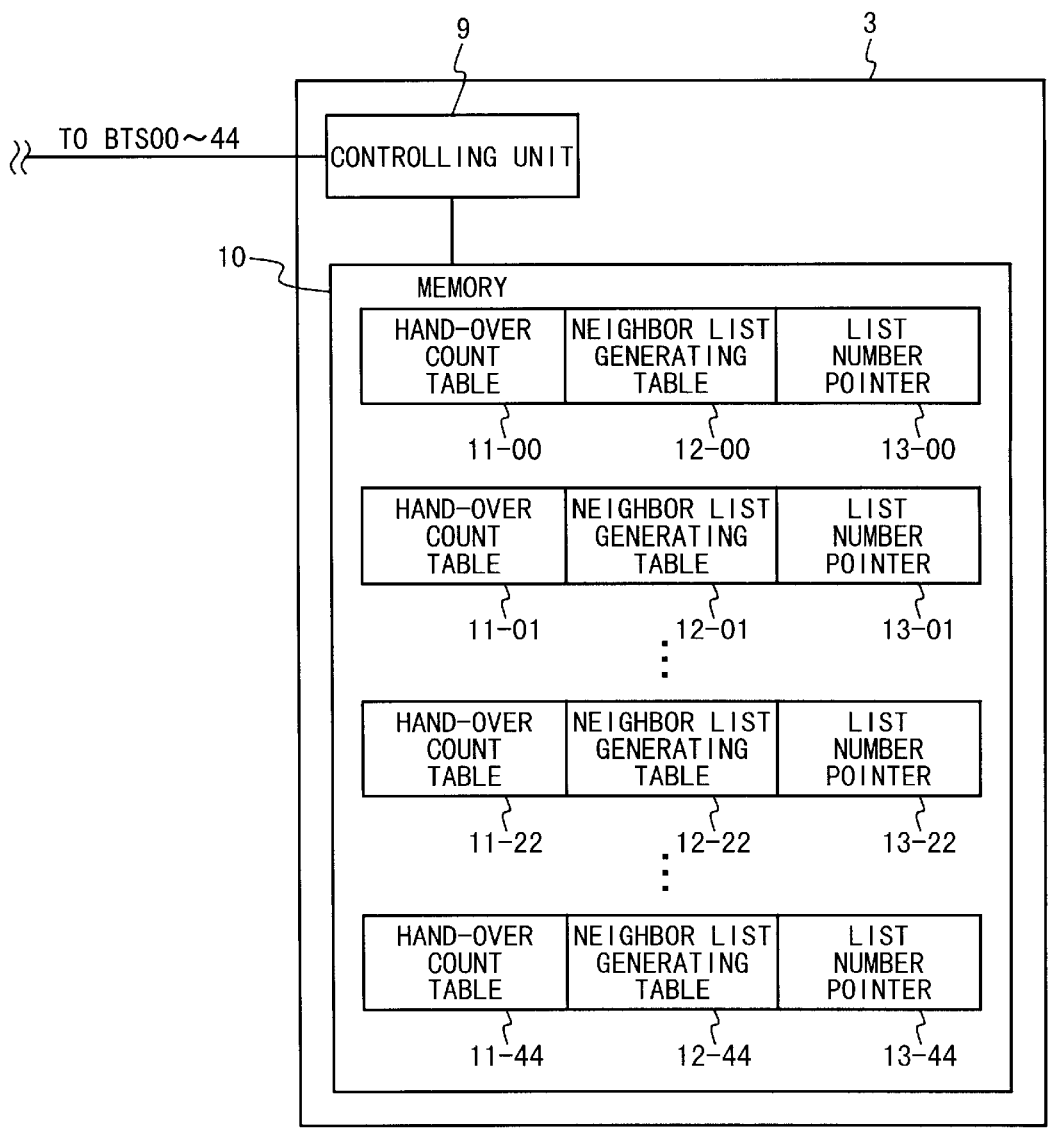
FIG. 5 is a schematic block diagram for indicating an arrangement of a control station 3.

FIG. 5 represents an internal arrangement of the above-described control station 3. The control station 3 contains a control unit 9. The control unit 9 processes signals which are received by the base stations BTS00 to BTS44 and are transmitted from the mobile station 2. Also, this control station 9 produces a signal to be transmitted to the mobile station 2, and then transmits the produced signal to a mobile station among the base stations BTS00 to BTS44.

This control unit 9 is also connected to a memory 10. The memory 10 contains hand-over count tables 11-00 to 11-44. In this embodiment, these hand-over count tables are provided in an one-to-one correspondence with respect to the base stations. For example, the hand-over count table 11-00 corresponds to the base station BTS00. Similarly, a hand-over count table 11-i corresponds to a base station BTSi. In this case, symbol "i" is any integer selected between 00 and 44.

FIG. 6 represents a content of one hand-over count table 11-22 among the plural hand-over count tables 11-00 to 11-44. This hand-over count table 11-22 contains a column 14-22 and another column 15-22. In this column 14-22, the base station codes of the plural base stations other than the base station BTS22. In the column 15-22, frequencies of occurrences at which a hand-over operation occurs from this base station BTS22 to other base stations.

In this case, a "hand-over" occurred from one base station BTSi to another base station BTSk implies such an operation that the mobile station 2 which has established the link with the base station BTSj newly establishes a link with the base station BTSk. Symbols "j" and "k" show any one of integers selected between 00 to 44. Also, the integer "j" is not equal to the integer "k".

While this mobile communication system employs either the FDMA communication system or the TDMA communication system, in the case that the mobile station 2 which has established the link with the base station BTSj newly establishes a link with the base station BTSk, the link established between the mobile station 2 and the base station BTSj is cut off, or interrupted. On the other hand, while the mobile communication system employs the CDMA communication system, the link established between the mobile station 2 and the base station BTSi is not cut off in the above case. It should be understood that the "hand-over" operation conducted in this specification conceptionally covers both the following cases. That is to say, the mobile station 2 which has established the link with the base station BTSj newly establishes the link with the base station BTSk, while this link with the first-mentioned base station BTSj is cut off. In addition, this base station 2 which has established the link with the base station BTSj newly establishes the base station BTSk, while the link with the base station BTSj is not cut off.

The occurrence frequencies at which the hand-over operations occur are recorded every base station. A total number of occurrences of hand-over operations from the base station BTS22 to the base station BTS14 is recorded in a row 16-22a. Similarly, a total number of occurrences of hand-over operations from the base station BTS22 to the base station BTS15 is recorded in a row 16-22b. Furthermore, total numbers of occurrences of hand-over operations from this base station BTS22 to the respective base stations BTS21, BTS23, BTS29, BTS30, BTS07, BTS08, BTS09, BTS13, BTS16, BTS20, BTS24, BTS28, BTS31, BTS35, BTS36, and BTS37 are recorded in the respective rows 16-22c to 16-22r.

It should also be noted that all of the base stations except for the base station BTS22 need not be recorded in the column 14-22. Only such a base station may be recorded in which a hand-over operation may probably occur from the base station BTS22 to this relevant base station. Similarly, it should also be noted that a total number of hand-over operations occurred from all of other base stations need not be recorded in the column 15-22. Alternatively, a total number of hand-over operations occurred when the hand-over operations may probably occur from the base station BTS22 to this base station may be recorded.

In the hand-over count table 11-22, the base stations whose base station codes are recorded in the column 14-22 are classified into either a group G1 or a group G2. A classification as to whether a certain base station belongs to the group G1 or the group G2 may be determined based upon the number of times of hand-over operations from the base station BTS22 to the base station. The number of times of hand-over operations from base station BTS22 to such a base station belonging to the group G1 is higher than that of times of hand-over operations from base station BTS22 to such a base station belonging to the group G2. The group G2 is constructed of a plurality of groups G20, G21, and G22. A base station classified into the group G2 is further classified into any one of these groups G20, G21, and G22, It should also be noted that a total number of groups contained in the group G2 is not limited to 3.

In a column 17 to 22, names of the groups to which the respective base stations belong are recorded. A row 18-22a indicates that the base stations BTS14, BTS15, BTS21, BTS23, BTS29, and BTS30 belong the group G1. Also, a row 18-22b shows that the base stations BTS07, BTS08, BTS09, BTS13, BTS16, BTS20, BTS24, BTS28, BTS31, BTS35, BTS36, and BTS37 belong the group G2. A row 18-22c indicates that the base stations BTS 07, BTS 08, BTS09, and BTS 13 belong the group G20. Also, a row 18-22d shows that the base stations BTS16, BTS20, BTS24 and BTS28 belong the group G21. A row 18-22e indicates that the base stations BTS31, BTS35, BTS36 and BTS37 belong the group G22.

Other hand-over count tables 11-00 to 11-44 contain similar table contents. That is, a total number of hand-over operations occurred from the base station BTSi to another base stations is recorded in the hand-over count table 11-i.

Also, the hand-over count table 11-*i* records thereon such a fact that which base station other than the base station BTS*i* belongs to any one of the group G1 and the group G2. Furthermore, the hand-over count table 11-*i* records thereon such a fact that the base station belongs to the group G2 in the hand-over count table 11-*i* belongs to any one of the groups G20, G21, and G22.

The memory 10 further contains neighbor list generating table 12-00 to 12-44. One neighbor list generating table is provided in one base station. The neighbor list generating table 12-00 corresponds to the base station BTS00. Similarly, the neighbor list generating table 12-*i* corresponds to the base station BTS*i*. In this case, symbol "i" shows any integer selected between 00 and 44.

FIG. 7 represents a table content of a neighbor list generating table 12-22 selected from the neighbor list generating tables 12-00 to 12-44. The neighbor list generating table 12-22 contains rows 19-22*a* to 19-22*c*. A list 1, a list 2, and a list 3 are recorded on the rows 19-22*a*, 19-22*b*, and 19-22*c*, respectively. The list 1 contains the base station codes of the base stations classified to the group G1, and the base station codes of the base stations classified to the group G20 in the hand-over count table 11-22. Also, the list 2 contains the base station codes of the base stations classified to the group G1, and the base station codes of the base stations classified to the group G21 in the hand-over count table 11-22. Also, the list 3 contains the base station codes of the base stations classified to the group G1, and the base station codes of the base stations classified to the group G22 in the hand-over count table 11-22.

The base station codes of the base stations contained in the group G1 are involved in any of the lists 1 to 3. On the other hand, the base station codes of the base stations contained in the group G2 are involved in only one of these lists 1 to 3.

In the case that the base station BTS22 establishes the link with the mobile station 2, the control station 3 transmits one of the lists recorded in the neighbor list generating table 12-22 as a neighbor list to the mobile station 2. In this neighbor list transmitted to the mobile station 2 when the base station BTS22 establishes the link with the mobile station 2, the base station codes of the base stations classified to the group G1 in the neighbor list generating table 12-22 are necessarily involved. On the other hand, the base station codes of the base stations classified to the group G2 in the neighbor list generating table 12-22 may be involved, or may not be involved in such a neighbor list which is transmitted to the mobile station 2 in the case that the base station BTS22 establishes the link with this mobile station 2.

Other neighbor list generating tables contain table contents similar to the table content of the neighbor list generating table 12-22.

The memory 10 further stores thereinto list number pointers 13-00 to 13-44. One list number pointer is provided in correspondence with one base station. The list number pointer 13-00 corresponds to the base station BTS00. Similarly, the list number pointer 13-*i* corresponds to the base station BTS*i*. In this case, symbol "i" shows any integer selected between 00 and 44.

Each of the list number pointers 13-00 to 13-44 stores thereinto any one of numeral values 1, 2, and 3. These list number pointers 13-00 to 13-44 are used to determine that any one of the lists 1 to 3 contained in the neighbor list generating tables 12-00 to 12-44 is transmitted to the mobile station 2.

Hand-over Operation by Mobile Communication System

Subsequently, operations of the mobile communication system according to this embodiment mode will now be explained. First, operation of this mobile communication system when the hand-over operation is carried out will now be described by using such an example that the hand-over operation is carried out from the base station BTS22 to the base station BTS14.

An initial condition of this mobile communication system will now be explained. It is now assumed that a mobile station 2*a* within the mobile station 2 is connected to the base station BTS22. Also, it is assumed that in this mobile station 2*a*, the content (shown in FIG. 4) of the neighbor list is stored in the neighbor list storage unit 8. The neighbor list stored in the neighbor list storage unit 8 contains the base station codes BTS14, BTS15, BTS21, BTS23, BTS29, BTS30, BTS07, BTS08, BTS09, and also BTS13. This neighbor list is transmitted from the control station 3 via the base station BTS22 to the mobile station 2*a* in such a case that the mobile station 2*a* establishes the link with the base station BTS22.

Figures 8, 9:
FIG. 8 represents a table content of a hand-over count table 12-14 employed in the mobile communication system.
FIG. 9 indicates a content of a list number pointer 13-14.

On the other hand, it is also assumed that the neighbor list generating table 12-14 contains a table content shown in FIG. 8. The list 1 of this neighbor list generating table 12-14 contains the base station codes BTS07, BTS08, BTS13, BTS15, BTS21, BTS22, BTS02, BTS03, BTS04, and BTS06. Also, the list 2 of this neighbor list generating table 12-14 contains the base station codes BTS07, BTS08, BTS13, BTS15, BTS21, BTS22, BTS09, BTS12, BTS16, and BTS20. Also, the list 3 of this neighbor list generating table 12-14 contains the base station codes BTS07, BTS08, BTS13, BTS15, BTS21, BTS22, BTS23, BTS28, BTS29, and BTS30.

Furthermore, it is now assumed that the list number pointer 13-14 saves "1" as represented in FIG. 9.

In addition, it is assumed that the hand over count table 11-22 contains the table content as indicated in FIG. 6. Since this table content has been previously explained, no further explanation thereof is made in this specification. Moreover, it is assumed that the hand over count table 12-22 contains the table content as indicated in FIG. 7. Since this table content has been previously explained, no further explanation thereof is made in this specification.

As represented in FIG. 2, under the above-explained initial condition, the mobile station 2*a* which is connected to the base station BTS22 is approached to another base station BTS14. Then, a description will now be made of operations of this mobile communication system according to this embodiment mode in such a case that the link established between the base station BTS22 and the mobile station 2*a* is handed over the base station BTS14.

Figure 10:
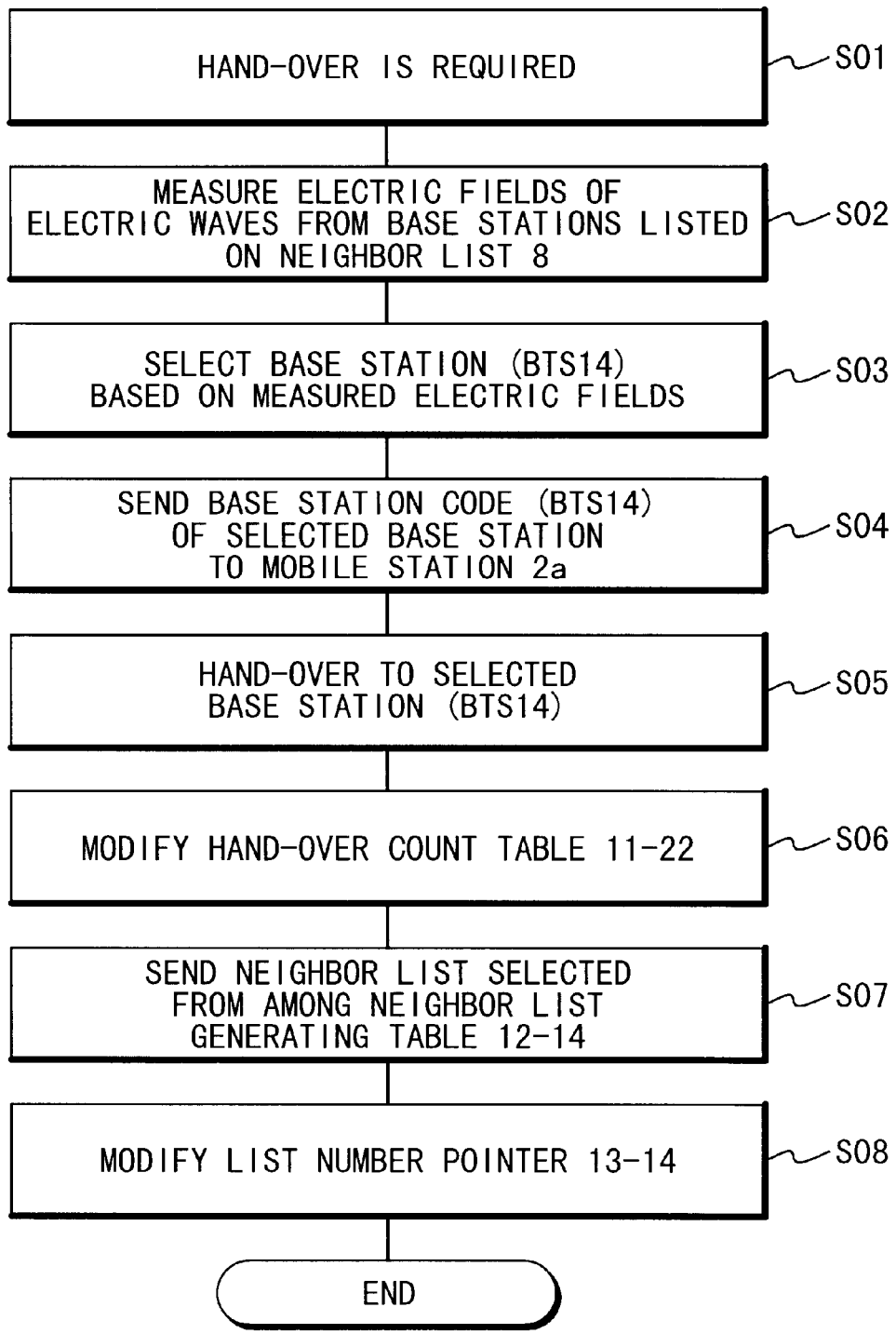
FIG. 10 is a flow chart for describing operations of the mobile communication system when a hand-over operation occurs in the mobile communication system.

First, referring now to a flow chart shown in FIG. 10, a hand-over request is issued (step S01). In other words, when this mobile communication system of this embodiment mode employs either the FDMA communication system or the TDMA communication system, if electric field intensities of electromagnetic waves transmitted from the base station BTS22 to the mobile station 2*a* are lowered, then such a hand-over request is issued from this mobile station 2*a*. On the other hand, when this mobile communication system employs the CDMA communication system, the mobile station 2*a* issues such a hand-over request in the case that a total number of base stations to which this mobile station 2*a* is communicated is not reached to a preselected number.

When the hand-over request is issued, the mobile station 2*a* measures electric field intensities of electromagnetic waves transmitted from the base stations having the base station codes listed in the neighbor list stored into the neighbor list storage unit 8 (step S02). That is, the neighbor list stored into the neighbor list storage unit 8 contains the base station codes BTS14, BTS15, BTS21, BTS23, BTS29, BTS32, BTS07, BTS08, BTS09, and BTS13. This mobile station 2a measures the electric field intensities of the electromagnetic waves transmitted from the base stations BTS14, BTS15, BTS21, BTS23, BTS29, BTS30, BTS07, BTS0B, BTS09,and BTS13. Then, the mobile station 2a transmits the measured electric field intensities to the base station BTS22 in the form of a hand-over request signal "a". This base station BTS22 sends the received hand over request signal "a" to the control station 3.

Subsequently, the control station 3 selects such a base station functioning as a hand-over destination based upon the measured electric field strength (step 03). In this embodiment mode, the control station 3 selects the base station BTS14.

Next, the control station 3 notifies the base station code of the base station functioning as the hand-over destination to the mobile station 2a in the form of the base station notification signal "b" (step 04).

Subsequently, the mobile station 2a hands over the established link to the base station BTS14 (step S05). Thus, the mobile station 2a establishes a link with this selected base station BTS14. At this time, when this mobile communication system employs either the FDMA communication system or the TDMA communication system, the link established between the mobile station 2a and the base station BTS22 is cut off, or interrupted. On the other hand, when this mobile communication system employs the CDMA communication system, the link established between the mobile station 2a and the base station BTS22 is maintained without any change.

Subsequently, the table content of the hand-over count table corresponding to such a base station which has been connected to the mobile station 2a before the hand-over operation occurs is updated (step S06). In this embodiment, the base station which has been connected before the hand-over operation occurs is equal to the base station BTS22. That is, the table content of the hand-over count table 11-22 is updated. Then, "1" is added to the occurrence count of the hand-over operation occurred from the base station BTS22 to the base station BTS14. As indicated in FIG. 11, the portion on which the occurrence count of the hand-over operation occurred from the base station BTS22 to the base station BTS14 is recorded is updated from 100 to 101.

Subsequently, a selection is made of one list as a neighbor list from a plurality of lists contained in the neighbor list generating table corresponding to the base station functioning as the hand-over destination. This selected neighbor list is transmitted to the mobile station 2a in the form of the neighbor list notification signal "c" (step S07). Selecting of which list as the neighbor list may be determined based upon the list number pointer corresponding to the base station functioning as the hand-over destination. In such a case that this list number pointer maintains 1, the list 1 contained in this neighbor list generating table is selected as the neighbor list. In such a case that this list number pointer maintains 2, the list 2 contained in this neighbor list generating table is selected as the neighbor list. In such a case that this list number pointer maintains 3, the list 3 contained in this neighbor list generating table is selected as the neighbor list.

The base station functioning as the hand-over destination is equal to the base station BTS14. The neighbor list generating table corresponding to this base station BTS14 is equal to the neighbor list generating table 12-14. Any one of the lists 1 to 3 contained in the neighbor list generating table 12-14 is transmitted to the mobile station 2a.

The list number pointer 13-14 corresponding to the base station BTS14 holds 1. The list 1 among the lists contained in the neighbor list generating table 12-14 is transmitted as the neighbor list to the mobile station 2a. The neighbor list which has been stored in the neighbor list storage unit 8 is updated by this transmitted neighbor list. The neighbor list stored in the neighbor list storage unit 8 is updated in such a manner that this neighbor list contains the base station codes BTS07, BTS08, BTS13, BTS15, BTS21, BTS22, BTS02, BTS04, and BTS06.

Next, the list number pointer corresponding to the base station functioning as the hand-over destination is updated. The list number pointer corresponding to the base station functioning as the hand-over destination is added by 1. It should be understood that when this list number pointer maintains 3, if this list number pointer is updated, then this list number pointer becomes 1.

The list number pointer 12-14 corresponding to the base station BTS14 is updated. The list number pointer 12-14 is added by 1. This list number pointer 12-14 is updated from 1 to 2.

With execution of the above-explained processing operation, the list number pointer of the base station functioning as the hand-over destination is updated every time the hand-over operation occurs. As a result, the neighbor lists which are transmitted to the mobile station 2 every time the hand-over operation to the base station BTS14 occurs are different from each other every time such a hand-over operation occurs.

The operation of this mobile communication system when the hand-over operation is carried out from the base station BTS22 to the base station BTS14 is completed. Also, when the hand-over operation is carried out from an arbitrarily selected base station "i" to another base station "j", this mobile communication system is operated in a similar manner. In this case, symbols "i" and "j" are integers selected between 00 and 44. The integer "i" is not equal to the integer "j".

In the case that the hand-over is executed, both the mobile station 2 and the control station 3 involved in this mobile communication system perform the process operations defined from the step S01 to the step S08 in accordance with a computer program recorded on the recording medium.

Alternatively, at the above-explained step S08, the list number pointers 12-00 to 12-14 are not updated every time the hand-over operation is carried out but may be automatically updated every time a constant time interval has passed.

Updating Process of Neighbor List Generating Table and Hand-Over Count Table

Figure 12:
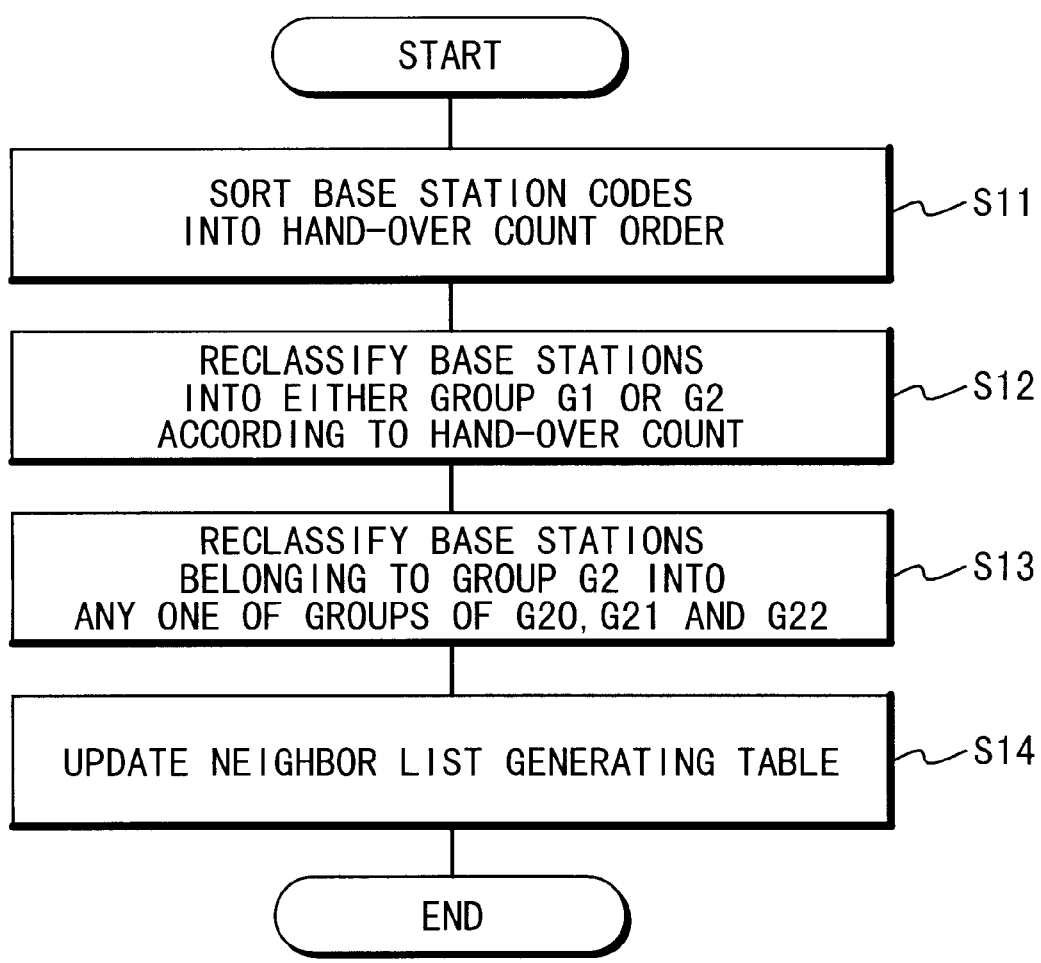
FIG. 12 is a flow chart for describing operation of the mobile communication system when a content of a neighbor list generating table is updated in the mobile communication system.

Next, a description will now be made of update processing operations as to both the hand-over count tables 11-00 to 11-44, and the neighbor list generating tables 12-00 to 12-44. Both the hand-over count tables 11-00 to 11-44, and the neighbor list generating tables 12-00 to 12-44 are updated at preselected timing. FIG. 12 is a flow chart for describing updating process operations as to the hand-over count tables 11-00 to 11-44, and also the neighbor list generating tables 12-00 to 12-44. The following updating process operation will now be made of such a case that both the hand-over count table 11-22 and the neighbor list generating table 12-22 are updated which correspond to the base station BTS22.

It is now assumed that the hand-over count table 11-22 contains the table content shown in FIG. 11.

First, the rows 16-22a to 16-22r of the hand-over count table 11-22 are sorted in the order of the number of times of hand-over operations (step S11).

Next, the base stations recorded in the hand-over count table 11-22 are reclassified into any one of the groups G1 and G2 (step S12).

A certain base station among the above-explained base stations recorded in this hand-over count table 11-22 is classified into the group G1 in the case that a total time of occurrences of the hand-over operations performed between the first-mentioned base station and the base station BTS22 is larger than a preselected reference time. When this total occurrence time of the hand-over operations is not larger than this preselected reference time, this base station is classified into the group G2. In this embodiment mode, this reference time is selected to be 1. In other words, when a total number of occurrences of hand-over operations performed between the base station BTS22 and one base station becomes more than 1 time, this base station is classified into the group G1. It should be noted that this reference time may be selected to be any times other than 1.

Subsequently, such a base station classified into the group G2 is furthermore reclassified into any one of the groups G20, G21, and G22 (step S13). Four sets of base stations among the base stations which are reclassified into the group G2 are reclassified into the group G20. Other four sets of base stations among the base stations which are reclassified into the group G2 are reclassified into the group G21. The remaining four sets of base stations among the base stations which are reclassified into the group G2 are reclassified into the group G22. It should also be noted that a total number of these base stations which are reclassified into any one of the groups G20, G21, G22 may be selected to any integer other than 4.

Figure 13:
FIG. 13 shows a table content of the hand-over count table 11-22 which is sorted and rearranged in the stage that the table content of the neighbor list generating table is updated.

FIG. 13 represents a table content of the hand-over count table 11-22 which is updated in accordance with the process operations defined at the step S11 to the step S13. That is, such a base station which is handed over from the base station BTS 22 many times is reclassified into the group G1, whereas such a base station which is handed over from the base station BTS22 a few time is reclassified into the group G2. For instance, the base stations BTS14, BTS21, BTS29, BTS15, BTS23, BTS30, BTS07, and BTS13 are classified into the group G1. Also, the base stations BTS08, BTS09, BTS16, BTS20, BTS24, BTS28, BTS31, BTS35, BTS36, and BTS37 are reclassified into the group G2.

Also, 4 sets of these base stations BTS08, BTS09, BTS16, and BTS20 among the base stations reclassified into the group G2 are reclassified into the group G20.

Other 4 sets of these base stations BTS24, BTS28, BTS31, and BTS35 among the base stations reclassified into the group G3 are reclassified into the group G21.

The remaining 4 sets of these base stations BTS36, and BTS37 among the base stations reclassified into the group G2 are reclassified into the group G22.

Subsequently, the table content of the neighbor list generating table 12-22 is updated (step S14). That is, this neighbor list generating table 12-22 is updated as follows. As indicated in FIG. 14, the table content of the neighbor list generating table 12-22 is updated in such a manner that the list 1 contained in this neighbor list generating table 12-22 is constituted of the base station codes of the base stations reclassified into the group G1 and also the base station codes of the base stations reclassified into the group G20. Also, the table content of the neighbor list generating table 12-22 is updated in such a manner that the list 2 contained in this neighbor list generating table 12-22 is constituted of the base station codes of the base stations reclassified into the group G1 and also the base station codes of the base stations reclassified into the group G21. Also, the table content of the neighbor list generating table 12-22 is updated in such a manner that the list 3 contained in this neighbor list generating table 12-22 is constituted of the base station codes of the base stations reclassified into the group G1 and also the base station codes of the base stations reclassified into the group G22.

Since the above-explained process operations are executed, both the hand-over count table 11-22 and the neighbor list generating table 12-22 are updated, which correspond to the base station BTS22.

Figure 15:
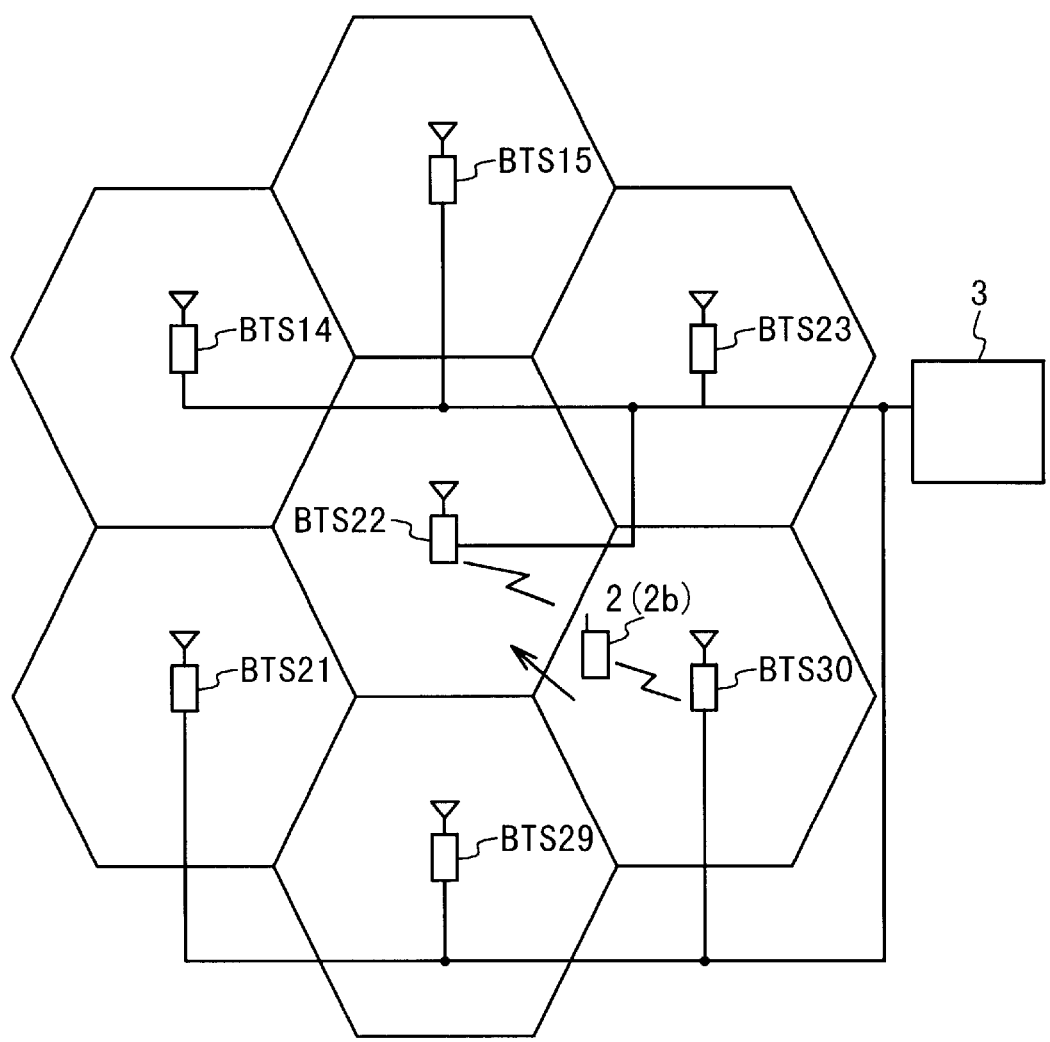
FIG. 15 illustratively shows a condition that a mobile station 2b establishes a link with respect to a base station BTS22.

Thereafter, as indicated in FIG. 15, it is now assumed that the mobile station 2b establishes a link with respect to the base station BTS22, and an hand-over operation is carried out from another base station to the base station BTS22. Any one of the lists 1 to 3 contained in the updated neighbor list generating table 12-22 is transmitted as a neighbor list to this mobile station 2b. The base station code of the base station belonging to the group G1 is necessarily contained in the neighbor list. On the other hand, the base station code of the base station belonging to the group G2 is contained only any one of the lists 1 to 3. In this case, the number of times of hand-over operations from base station BTS22 to the base station belonging to the group G1 is lower than the number of times of hand-over operations from the base station BTS 22 to the base station belonging to the group G1.

As previously explained, the neighbor list contains both the base station code of such a base station to which the number of times of hand-over operations is high, and also the base station code to which the number of times of hand-over operations is low. In this case, the base station code of such a base station to which the number of times of hand-over operations is high may have a high frequency at which this base station code is contained in the neighbor list. On the other hand, the base station code of such a base station to which the number of times of hand-over operations is low may have a low frequency at which this base station code is contained in the neighbor list.

The hand-over condition such that a mobile station which has established a communication link with respect to a certain base station is handed over any one of other base stations may be determined based upon electric field intensities of electromagnetic waves which are received from these base stations to this mobile station. This hand-over condition implies such a fact that there are many possibilities. That is, electric field intensities of electromagnetic waves transmitted from such base stations whose occurrence frequencies of hand-over operations are high become high. Since the frequency of the base station code contained in the neighbor list is increased and this base station code is such a base station to which the number of times of the hand-over operations is large, such a base station which could establish the better link condition may be selected as the base station of the hand-over destination.

On the other hand, a base station code of such a base station to which the number of times of hand-over operations is small is also contained in the neighbor list. A link condition between the mobile station and the base station to which the number of times of hand-over operations is small is also monitored. In such a case that there is a change in the desirable base station functioning as the base station of the hand-over destination, because the link condition is changed due to some reason, both the hand-over count table and the neighbor list generating table are updated in response to this change. As a result, such a neighbor list is formed in such a manner that the desirable base station functioning as the base station of the hand-over destination is contained in this neighbor list.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A mobile communication system comprising:
   a plurality of base stations including a first and second connecting base stations; and
   a mobile terminal connected to said first connecting base station,
   wherein relevant base stations are selected from among said plurality of base stations based on hand-over counts, each of which indicates the number of times of hand-over operations of said mobile terminal from said first connecting base station to one of said plurality of base stations, and
   wherein said second connecting base station is selected from among said relevant base stations based on electric field intensities from said relevant base stations, and said mobile terminal establishes a connecting link with said second connecting base station.

2. A mobile communication system according to claim 1, further comprising a controlling station, wherein said controlling station sends a neighbor list indicative of said relevant base stations to said mobile terminal,
   wherein said mobile terminal measures said electric field intensities in response to said neighbor list and sends a electric-field-indicative signal indicative of said electric field intensities to said controlling station, and
   wherein said controlling station selects said second connecting base station in response to said electric-field-indicative signal.

3. A mobile communication system according to claim 2, wherein said controlling station includes a hand-over count indicating table indicative of said hand-over counts and produces said neighbor list referring to said hand-over count indicating table.

4. A mobile communication system according to claim 3, wherein said hand-over count indicating table indicates that each of said plurality of base stations is classified into a plurality of groups based on said hand-over counts, and said plurality of groups consists of a dominant group and remaining ones of said plurality of groups,
   wherein the number of times of communication of said mobile terminal with base stations classified into said dominant group after communicating with said first connecting base station is larger than that with base stations classified into said remaining ones of said plurality of groups, and
   wherein said neighbor list indicates as said relevant base stations all of base stations classified into said first dominant group and include some but not all base stations classified into said remaining ones.

5. A mobile communication system according to claim 4, wherein said controlling station further includes a neighbor list generating table including a plurality of lists, and
   wherein base stations classified into said dominant group are indicated in each of said plurality of lists, and base stations classified into said remaining ones of said plurality of groups are indicated in one or more but not all of said plurality of lists, and said neighbor list is produced by being selected from among said plurality of lists.

6. A controlling station used in a mobile communication system comprising a controlling unit, wherein said controlling unit selects relevant base stations from among a plurality of base stations based on hand-over counts, each of which indicates the number of times of hand-over operations of a mobile terminal from a first connecting base station to one of said plurality of base stations,
   wherein said controlling unit sends a neighbor list indicative of said relevant base stations to said mobile terminal, and
   wherein said controlling unit selects a second connecting base station with which said mobile terminal establishes a connecting link from among said relevant base stations based on electric field intensities from said relevant base stations measured by said mobile terminal.

7. A controlling station according to claim 6, further comprising a hand-over count indicating table indicative of said hand-over counts, wherein said controlling unit produces said neighbor list referring to said hand-over count indicating table.

8. A controlling station according to claim 7, wherein said hand-over count indicating table indicates that each of said plurality of base stations is classified into a plurality of groups based on said hand-over counts, and said plurality of groups consist of a dominant group and remaining ones of said plurality of groups,
   wherein the number of times of hand-over operations of said mobile terminal to base stations classified into said dominant group after communicating with said first connecting base station is larger than that to base stations classified into said remaining ones of said plurality of groups, and
   wherein said neighbor list indicates as said relevant base stations all of base stations classified into said first dominant group and include some but not all base stations classified into said remaining ones.

9. A controlling station according to claim 8 further comprising a neighbor list generating table including a plurality of lists, wherein base stations classified into said dominant group are indicated in each of said plurality of lists, and base stations classified into said remaining ones of said plurality of groups are indicated in one or more but not all of said plurality of lists, and said neighbor list is produced by being selected from among said plurality of lists.

10. A method of operating a mobile communication system comprising:
    selecting relevant base stations from among a plurality of base stations based on hand-over counts, each of which indicates the number of times of hand-over operations of a mobile terminal from a first connecting base station to one of said plurality of base stations;
    selecting a second connecting base station from among said relevant base stations based on electric field intensities from said relevant base stations; and
    establishing a connecting link between said mobile station and said second connecting base station.

11. A method according to claim 10, wherein said selecting said second connecting base station includes:
    sending a neighbor list indicative of said relevant base stations from a controlling station to said mobile terminal;

measuring said electric field intensities in response to said neighbor list;

sending a electric-field-indicative signal indicative of said electric field intensities to said controlling station; and selecting said second connecting base station in response to said electric-field-indicative signal.

12. A method according to claim 11, further comprising providing a hand-over count indicating table indicative of said hand-over counts, wherein said sending a neighbor list comprises producing said neighbor list referring to said hand-over count indicating table.

13. A method according to claim 12, wherein said hand-over count indicating table indicates that each of said plurality of base stations is classified into a plurality of groups based on said hand-over counts, and said plurality of groups consists of a dominant group and remaining ones of said plurality of groups, wherein the number of times of communication of said mobile terminal with base stations classified into said dominant group after communicating with said first connecting base station is larger than that with base stations classified into said remaining ones of said plurality of groups, and wherein said neighbor list indicates as said relevant base stations all of base stations classified into said first dominant group and include some but not all base stations classified into said remaining ones.

14. A method according to claim 13, further comprising providing a neighbor list generating table including a plurality of lists, wherein base stations classified into said dominant group are indicated in each of said plurality of lists, base stations classified into said remaining ones of said plurality of groups are indicated in one or more but not all of said plurality of lists, and wherein said producing said neighbor list includes selecting said neighbor list from among said plurality of lists.

15. A computer-readable recording medium storing a program for a method which comprises:

selecting relevant base stations from among a plurality of base stations based on hand-over counts, each of which indicates the number of times of hand-over operations of a mobile terminal from a first connecting base station to one of said plurality of base stations;

selecting a second connecting base station from among said relevant base stations based on electric field intensities from said relevant base stations; and establishing a connecting link between said mobile station and said second connecting base station.

16. A computer-readable recording medium according to claim 15, wherein said selecting said second connecting base station includes:

sending a neighbor list indicative of said relevant base stations from a controlling station to said mobile terminal;

measuring said electric field intensities in response to said neighbor list;

sending a electric-field-indicative signal indicative of said electric field intensities to said controlling station; and selecting said second connecting base station in response to said electric-field-indicative signal.

17. A computer-readable recording medium according to claim 16, wherein said method further comprises providing a hand-over count indicating table indicative of said hand-over counts, and wherein said sending a neighbor list comprises producing said neighbor list referring to said hand-over count indicating table.

18. A computer-readable recording medium according to claim 17, wherein said hand-over count indicating table indicates that each of said plurality of base stations is classified into a plurality of groups based on said hand-over counts, and said plurality of groups consists of a dominant group and remaining ones of said plurality of groups, wherein the number of times of communication of said mobile terminal with base stations classified into said dominant group after communicating with said first connecting base station is larger than that with base stations classified into said remaining ones of said plurality of groups, and wherein said neighbor list indicates as said relevant base stations all of base stations classified into said first dominant group and include some but not all base stations classified into said remaining ones.

19. A computer-readable recording medium according to claim 17, wherein said method further comprises providing a neighbor list generating table including a plurality of lists, wherein base stations classified into said dominant group are indicated in each of said plurality of lists, base stations classified into said remaining ones of said plurality of groups are indicated in one or more but not all of said plurality of lists, and wherein said producing said neighbor list includes selecting said neighbor list from among said plurality of lists.

* * * * *